Oct. 14, 1958     W. B. DEAN ET AL     2,855,763
AIR CONDITIONING INSTALLATION FOR PASSENGER VEHICLES
Filed July 10, 1956     4 Sheets-Sheet 2
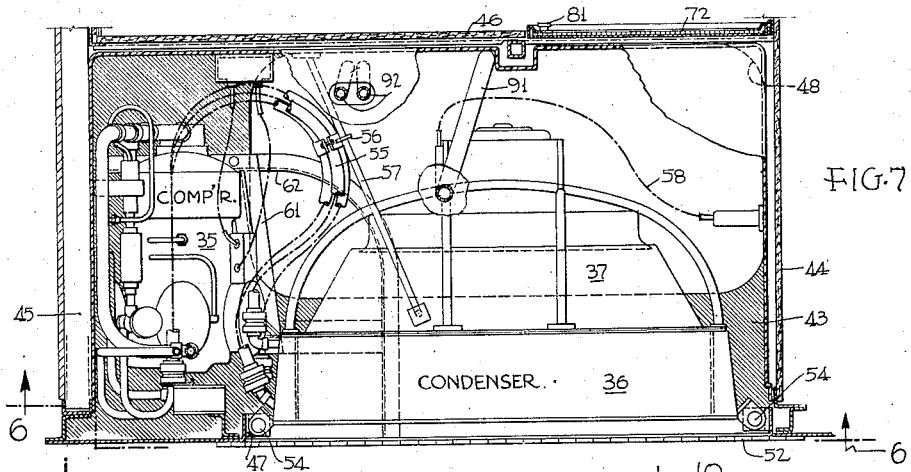
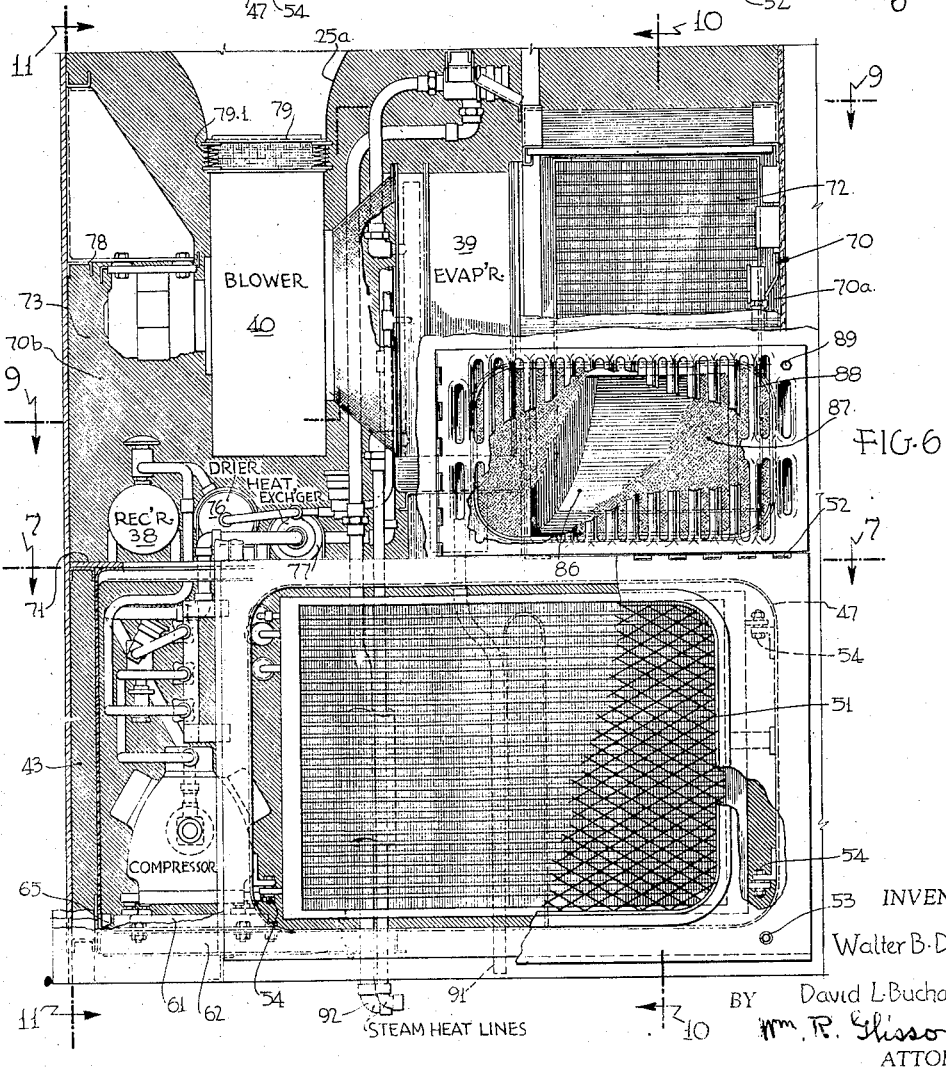
INVENTORS:
Walter B. Dean
David L. Buchanan
BY Wm. R. Glisson
ATTORNEY

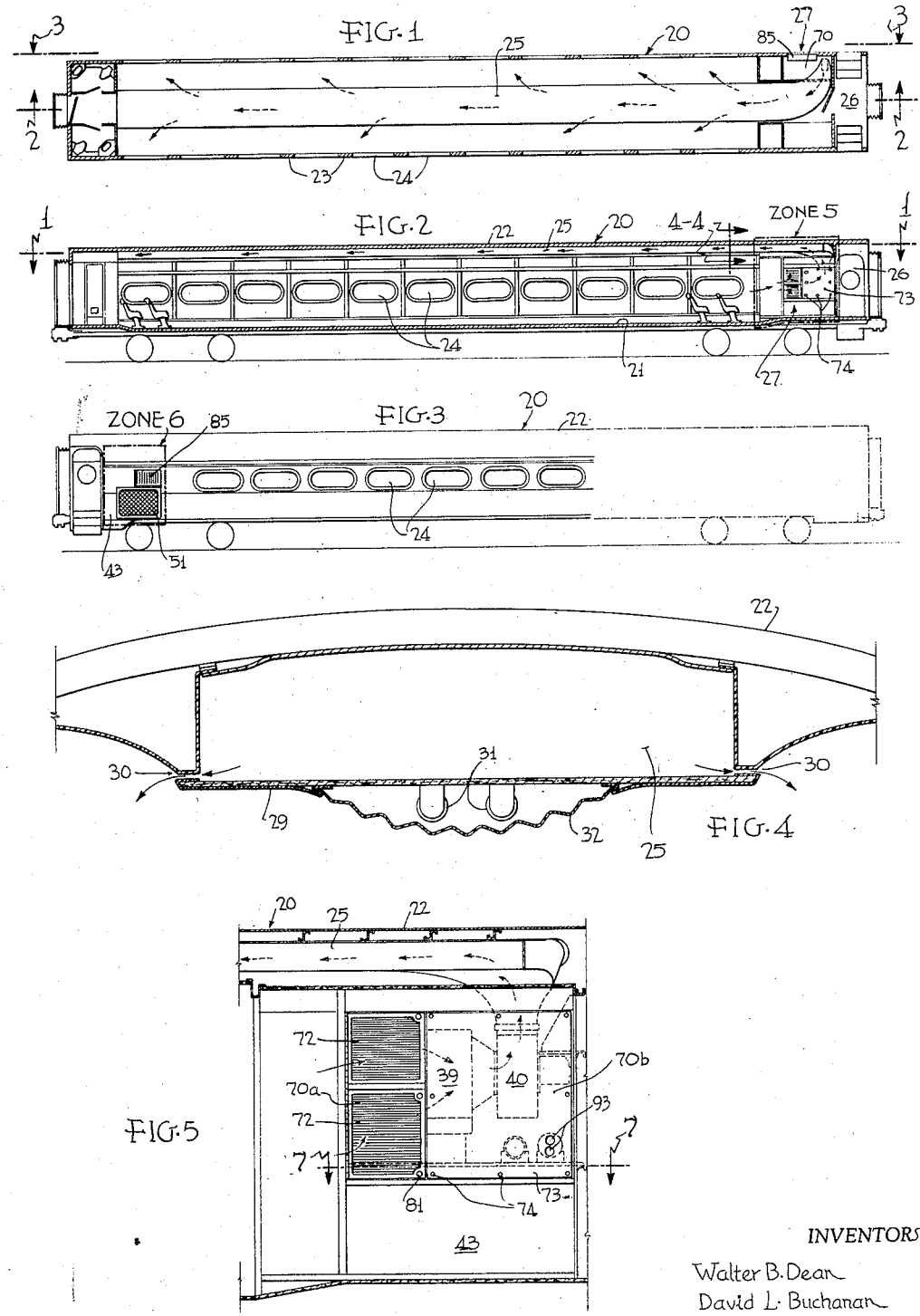

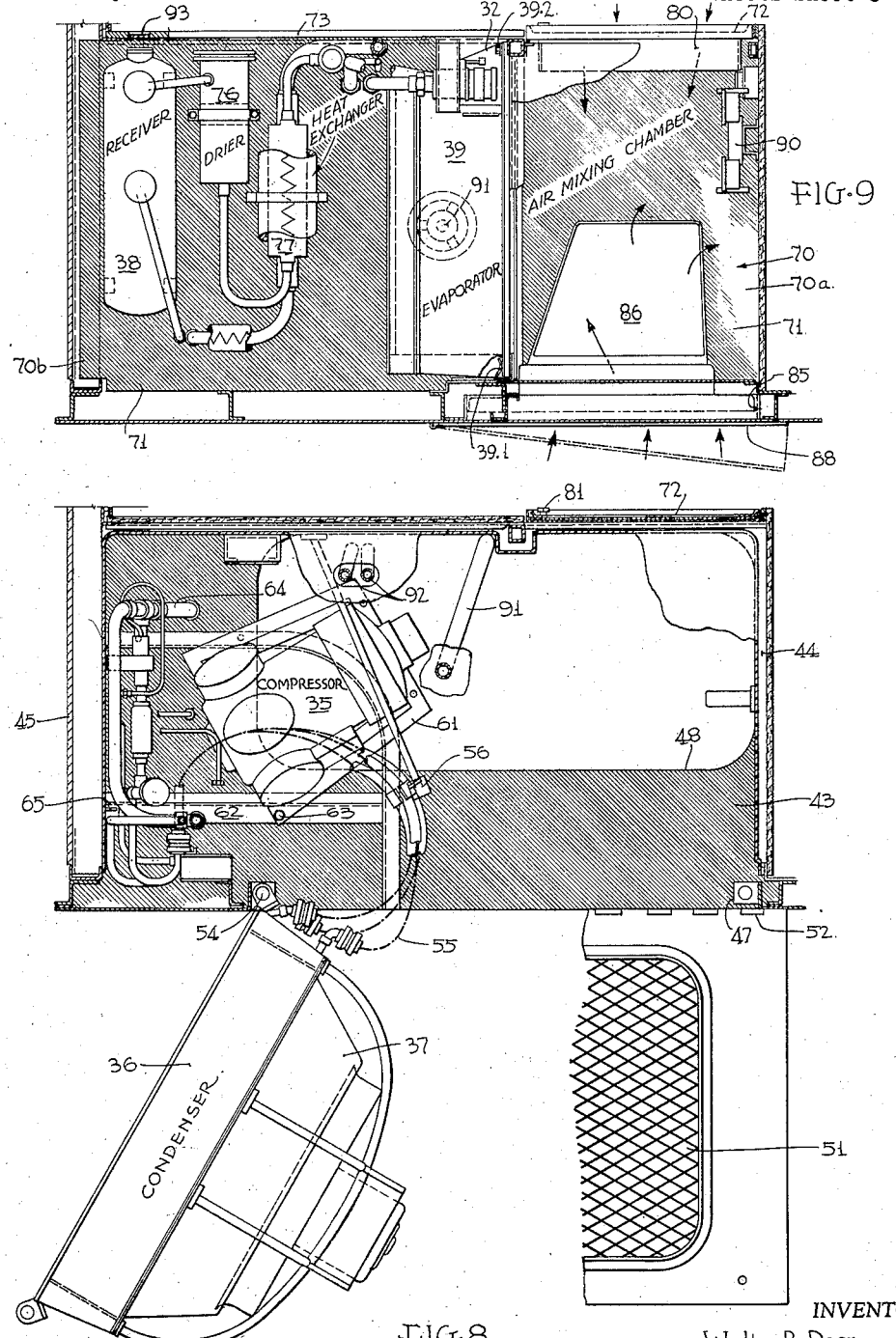

Oct. 14, 1958 W. B. DEAN ET AL 2,855,763
AIR CONDITIONING INSTALLATION FOR PASSENGER VEHICLES
Filed July 10, 1956 4 Sheets-Sheet 4

INVENTORS
Walter B. Dean
David L. Buchanan
BY
Wm R. Glisson
ATTORNEY

United States Patent Office 2,855,763
Patented Oct. 14, 1958

2,855,763

AIR CONDITIONING INSTALLATION FOR PASSENGER VEHICLES

Walter B. Dean, Narberth, and David L. Buchanan, Whitemarsh, Pa., assignors to The Budd Company, Philadelphia, Pa., a corporation of Pennsylvania Application July 10, 1956, Serial No. 596,883

9 Claims. (Cl. 62—302)

This invention relates to an air conditioning installation for passenger vehicles, especially for railway passenger cars, and has for an object the provision of improvements in this art.

In conventional standard size passenger cars it has been a fairly common practice to mount some or all of the air conditioning equipment in the overhead plenum space at one end of the car or to mount some or all of the equipment under the car. Often the compressor-condenser-fan portion of the equipment has been mounted under the car and the receiver-evaporator-blower portion has been mounted in the overhead plenum space.

With low light-weight cars which are being built in considerable numbers at present the total height and the under-floor height are both so restricted that it is no longer practicable to mount such equipment either overhead or underfloor. Since it is therefore desirable to mount the equipment above the floor and below the ceiling it is especially desirable and an object of the present invention that the equipment should occupy the minimum space, have the shortest connecting lines, and provide the maximum convenience of access; also that it should not transmit undue noise, vibration or heat to the passenger space.

According to the present invention the compressor-condenser-fan unit is disposed in a first compartment which is located above the floor and insulated from the space within the car and which has an opening through the sidewall of the car for access and for insertion and removal of equipment, the sidewall opening having a protective closure which is open for the passage of air therethrough. A condenser radiator is hinged in the sidewall opening behind the outer closure so as to swing outward to clear the space for access to a compressor unit. A fan mounted with the radiator draws air from the outside through the sidewall opening and radiator and discharges it through a bottom floor opening of the compartment. The compressor unit, including its drive motor, is mounted on a trackway to swing outward from an inner position to a position at the sidewall opening where it can be serviced or removed.

The evaporator with its blower and the receiver tank, together with control instruments, are mounted in an upper compartment which is separated from the car interior and provided with openings with closures for access from the interior for servicing or removing equipment. The evaporator forms part of a partition in the upper compartment between an air mixing chamber with controls and a chamber in which the receiver and the blower with its motor are mounted. The main supply duct leading from the blower is provided with an expansible joint connection which is readily removable by compressing lengthwise and moving out sidewise. Sight glass windows are provided for the receiver so the liquid level may be readily viewed from the aisle at any time.

The above-mentioned and other objects and features of the invention will be apparent from the following description of an exemplary embodiment, reference being made to the accompanying drawings thereof, wherein:

Fig. 1 is a horizontal section and plan view, taken on the line 1—1 of Fig. 2, showing the location of the air conditioning apparatus in a railway passenger car;

Fig. 2 is a vertical longitudinal section taken on the line 2—2 of Fig. 1;

Fig. 3 is a side elevation seen from the line 3—3 of Fig. 1;

Fig. 4 is an enlarged section through the main air supply duct taken on the line 4—4 of Fig. 2;

Fig. 5 is an enlarged partial vertical section and elevation of parts shown in the zone 5 of Fig. 2;

Fig. 6 is an enlarged elevation, with some parts removed and broken away, in the zone 6 of Fig. 3, the section line of the view also being shown on Fig. 7;

Fig. 7 is a horizontal section taken on the line 7—7 of Fig. 6, showing the lower compartment with compressor-condenser-fan equipment, the section line of the view also being shown on Fig. 5;

Fig. 8 is a view like Fig. 7 but showing some of the parts in different positions;

Fig. 9 is a horizontal section taken on the line 9—9 of Fig. 6, showing the upper compartment with receiver-evaporator and related equipment.

Figure 11:
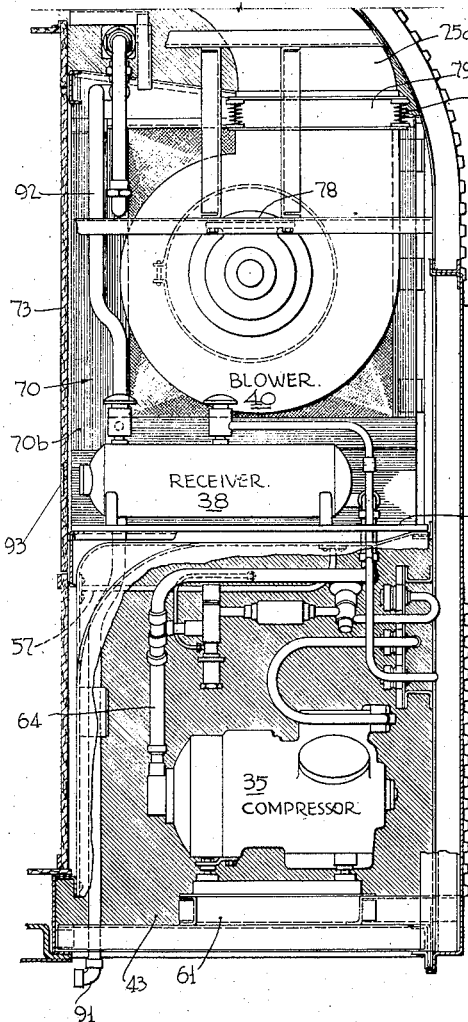
Fig. 11 is a transverse vertical elevation and section taken on the line 11—11 of Fig. 6.
Figure 10:
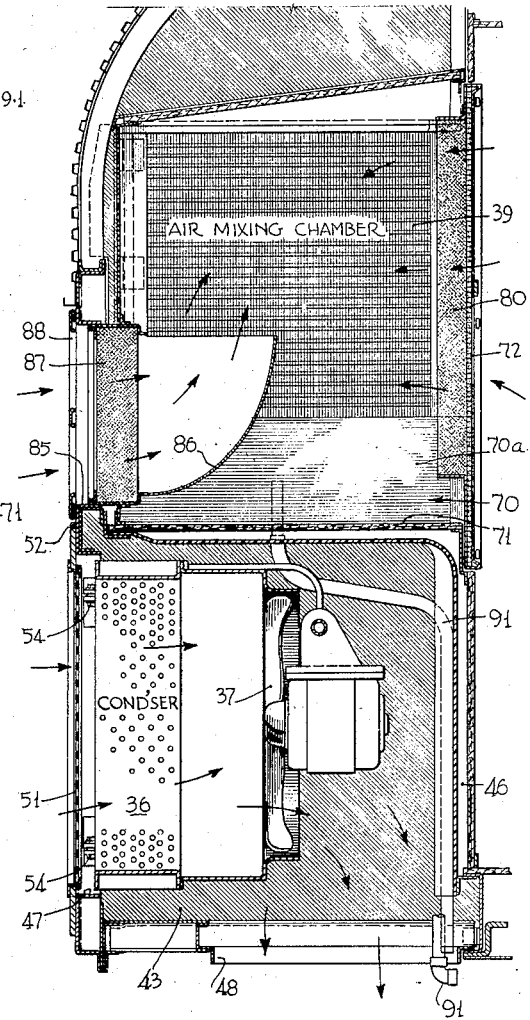
Fig. 10 is a transverse vertical elevation and section taken on the line 10—10 of Fig. 6.

As seen in Figs. 1 to 3, a vehicle 20, here a railway passenger car, having a floor 21, roof 22, sidewalls 23 with windows 24, an overhead air distribution duct 25, and an end vestibule 26, is provided with air conditioning equipment 27 in a space at one side of a center aisle at the vestibule end. The duct 25 is above the ceiling 29 and discharges air through slitted openings 30 (Fig. 4) on each side. Fluorescent lighting tubes 31 are mounted on the removable panels which form the bottom of the duct and a translucent canopy 32 covers the light tubes. Return air flows back through the open passenger space in the car to the air mixing chamber, as will be explained later.

The air conditioning apparatus itself is of the usual type, comprising a compressor unit 35, which includes its driving motor, a condenser unit radiator 36 and fan 37, with its drive motor, a receiver 38, an evaporator radiator 39, and blower 40, with its drive motor, and the necessary piping, wiring and appurtenances.

According to the present invention, the compressor 35 and condenser-fan unit 36 are arranged within a lower compartment 43 having sound and heat proofed double wall separation from the main space within the car, as by a front wall 44, a rear wall 45 and an aisle wall 46, and which has a side opening or aperture 47 in the car sidewall and a bottom opening or aperture 48 through the floor of the car. The side opening serves for the intake of air for cooling the condenser and for access; and the bottom opening serves for the discharge of air toward the roadbed, where it will not interfere with persons standing alongside the car. By this arrangement the floor structure, without any special supports, carries the weight of the equipment, thus avoiding the cost and weight of special supporting means and avoiding the possibility of dropping equipment onto the track which exists with all undercar mounted equipment.

On the outside the side opening 47 is provided with a protective grill-like closure 51 which at its upper edge is hinged at 52 and is secured at its lower edge, as by captive cap screws 53. This closure is light and when open may be held up in a convenient way, as for example by friction in the hinge mounting or by props.

Inside the outer protective grill closure there is mounted the condenser unit 36 with its fan and motor, the mounting being on shock absorbing hinges 54 at either side with removable bolts for hinge pins whereby the swinging movement may be in either direction or the unit may be completely removed if desired. Normally the unit will be swung about the left side, as seen in Figs. 7 and 8, carrying with it its fluid lines 55 which near the middle of the free loop are supported by a slide 56 movable along a rod 57 anchored overhead at one end and at the inner wall at the other end. The electrical cable 58, shown in chain lines in Fig. 7, may be disconnected if desired. As shown in Fig. 8, the condenser may be swung out until the side opening is fully cleared for access to the compressor unit 35.

The compressor 35 also is mounted to swing out for access or removal. As shown, it is provided with a base 61 which is bolted to a base frame 62. When all but one hinge bolt 63 have been removed and the connection to the intake line 64 has been separated, the compressor can be swung around on the base frame 62 until it is accessible at the side opening. If the other lines to the compressor and the hinge bolt 63 are removed the compressor can be removed. The rear outer corner of the base 61 is pushed beneath a gripping retainer 65 so that it may be clamped down or released by the swinging movement and does not require bolting in this rather inaccessible corner.

An upper compartment 70 is provided above the lower compartment 43, a floor 71 forming the separation as well as the support for some of the apparatus located in the upper compartment. The front wall 44 extends up to the ceiling 29 but for the upper compartment need not be made as resistant to noise and heat as for the lower compartment. As shown in Fig. 5, the inside wall is largely framed for access openings which are covered by hinged doors 72 and a removable closure 73 which is secured by screws 74.

The evaporator 39 with its frame subdivides the upper compartment 70 into front and rear chambers 70a and 70b respectively, the front chamber providing an air mixing space and the rear chamber providing space to house the blower 40, the receiver 38, a drier 76, a heat exchanger 77 and other related equipment. The receiver, drier and heat exchanger are mounted on the floor 71 and the blower unit is mounted on a bracket 78 on the rear wall. The outer edge of the evaporator, where access is difficult, is pushed into positioning clips 39.1 and the inner edge is secured by bolts 39.2.

An expansible flexible connection 79, as of a fabric or rubber, is disposed between the mouth of the blower and the downwardly extending inlet end 25a of the main duct 25. The ends of the connection embrace the associated duct openings and springs 79.1 urge the connection into distended condition. For removal, it is only necessary to squeeze it to shorter shape and pull it out laterally.

The aisle opening of the air mixing chamber 70a which is covered by the hinged doors 72 is provided with means to hold air filters 80. The doors are held closed by screws 81. At the outer side an opening 85 is provided and a fresh air duct 86 is secured to the inner side of the opening, the duct being curved to a top outlet to cause air to enter at a distance from the intake side of the evaporator whereby to require it to mix thoroughly with return air passing through the doors 72 before passing to the evaporator. Means are provided in the opening to hold an air filter 87 and a gridded door 88 is provided at the outer wall over the opening. The door is hinged at the rear edge and is held closed by screws 89.

Instruments and controls, generally indicated by the numeral 90 are located in the front of the mixing chamber.

A condensate drain pipe 91 extends from the catch basin of the evaporator radiator downward through the floor.

Steam pipes 92 extend to separate coils in the evaporator so that heat may be added to dry the air or so the air may be heated in cold weather when refrigeration is not needed.

Vertically spaced sight windows 93 are provided in the receiver 38 and aisle wall above and below the normal operating level of the liquid refrigerant so this level may be checked from the aisle at any time.

It is thus seen that the invention provides a very compact installation in which the connecting lines are very short, which provides quick and convenient inspection, servicing or replacement of units, which requires a minimum of separate housing, which has no parts mounted beneath the vehicle where they would be difficult of access or likely to drop down on the roadway, which occupies the minimum of usable space in the vehicle, which minimizes noise and heat in the usable space, and which in other ways is an improvement in the art.

While one embodiment has been disclosed by way of illustration, it is to be understood that there may be various embodiments and modifications within the general scope of the invention.

What is claimed is:

1. An air conditioning installation for vehicles, especially for railway passenger cars which have a floor, roof, sidewalls and aisle, comprising in combination, enclosure means forming with the floor and sidewall a lower compartment and an upper compartment, the lower compartment having at one end an opening through a sidewall and another opening through the floor, a hinged support in the sidewall opening mounted to swing outwardly about a vertical axis, a condenser radiator and fan with drive motor mounted on said hinged support, the fan being driven in the direction to draw air in through the side opening for discharge through the bottom opening, a compressor-motor unit mounted in the lower compartment for swinging movement about a vertical axis from an inner position to a position at the sidewall opening, and an evaporator and blower mounted in the upper compartment.

2. An air conditioning installation for vehicles, especially for railway passenger cars which have a floor, roof, sidewalls and aisle, comprising in combination, means forming a lower compartment and an upper compartment at a sidewall, the lower compartment having at one end a side opening and a bottom opening and at the other end having a bottom support carried by the vehicle floor supports, a condenser-fan-motor unit mounted in the side opening to draw air in from the side and discharge it through the bottom opening, the mounting for said condenser-fan-motor unit providing movement outward to clear the side opening, and a compressor-motor unit mounted on the bottom support at one side of said openings so as to be accessible when the condenser-fan-motor unit is moved clear of the side opening, said compressor-motor unit being mounted on the bottom support to swing about a vertical axis adjacent an edge of the side opening so as to swing from an inner position to a position at said sidewall opening for servicing or removal.

3. An air conditioning installation for vehicles, especially for railway passenger cars which have a floor, roof, sidewalls and aisle, comprising in combination, means forming a lower compartment and an upper compartment at a sidewall, the lower compartment having at one end a side opening and a bottom opening and at the other end having a bottom support carried by the vehicle floor supports, a condenser-fan-motor unit mounted in the side opening to draw air in from the side and discharge it through the bottom opening, the mounting for said condenser-fan-motor unit providing movement outward to clear the side opening, and a compressor-motor unit mounted on the bottom support at one side of said openings so as to be accessible when the condenser-fan-motor unit is moved clear of the side opening, said compressor-motor unit being mounted on the bottom support to swing about a vertical axis adjacent an edge of the side opening so as to swing from an inner position to a position at said sidewall opening for servicing or removal, said compressor-motor unit having at a side distant from the side opening a socket type clamp fitting which holds it in position when swung into cooperating relationship therewith, and bolt-down means for the compressor-motor unit at other points.

4. An air conditioning installation for vehicles, especially for railway passenger cars which have a floor, roof, sidewalls and aisle, comprising in combination, means forming a lower compartment and an upper compartment at a sidewall, the lower compartment having at one end a side opening and a bottom opening and at the other end having a bottom support carried by the vehicle floor supports, a condenser-fan-motor unit mounted in the side opening to draw air in from the side and discharge it through the bottom opening, the mounting for said condenser-fan-motor unit providing movement outward to clear the side opening, and a compressor-motor unit mounted on the bottom support at one side of said openings so as to be accessible when the condenser-fan-motor unit is moved clear of the side opening, said compressor-motor unit being mounted on the bottom support to swing about a vertical axis adjacent an edge of the side opening so as to swing from an inner position to a position at said sidewall opening for servicing or removal, said bottom support for the compressor-motor unit including a curved track on which the unit moves when turning about the vertical axis.

5. An air conditioning installation for vehicles, especially for railway passenger cars which have a floor, roof, sidewalls and aisle, comprising in combination, means forming a compartment space separated from the inside space for air conditioning equipment, the compartment space having a bottom opening, an outside opening in the lower part of its height, and an inside opening in the upper part of its height, a condenser-fan-motor unit mounted in the lower part of the compartment space at the outside opening and being removable therethrough, a compressor-motor unit mounted in the lower part of the compartment for access through the outside opening and being removable through said opening, an evaporator mounted in the upper part of said compartment space and with its mounting framing dividing the upper space into a plenum air mixing chamber and a second chamber, an outside opening for supplying outside air to said plenum mixing chamber, means providing ingress of used car air to said plenum mixing chamber, and a blower-motor unit mounted in said second chamber with the blower connected between the evaporator and a supply duct for the car, the blower-motor unit being accessible and removable through the inside opening, and a removable closure for said inside opening.

6. An installation as set forth in claim 5, in which a duct connection of said blower is formed by an expansible connector removably fitting duct parts and removable by shortening its length and moving it laterally.

7. An installation as set forth in claim 5, in which said evaporator at the outer edge is provided with socket connections which are interengaged by transverse movement of the evaporator, and bolted connections for the accessible inner edge of the evaporator.

8. An installation as set forth in claim 5, in which said compartment space at the upper part forming the plenum mixing chamber is provided with an inside opening of a size for access and removal of the evaporator, and an apertured closure carrying air filter means over said inside opening.

9. An installation as set forth in claim 5, in which controls and instruments are mounted in the plenum mixing chamber, the plenum mixing chamber having an inside access opening and an openwork closure for the intake from the vehicle interior.

References Cited in the file of this patent

UNITED STATES PATENTS

| | | |
|---|---|---|
| 1,100,015 | Hirth | June 16, 1914 |
| 1,921,257 | Melcher | Aug. 8, 1933 |
| 2,293,360 | Reilly et al | Aug. 18, 1942 |
| 2,513,679 | Ritter | July 4, 1950 |
| 2,663,163 | Mansmann | Dec. 22, 1953 |
| 2,673,100 | Shumaker | Mar. 23, 1954 |
| 2,758,453 | Kernjack | Aug. 14, 1956 |